(12) United States Patent
Imhof et al.

(10) Patent No.: US 10,808,665 B2
(45) Date of Patent: Oct. 20, 2020

(54) CAMSHAFT FOR A PUMP, IN PARTICULAR A HIGH PRESSURE FUEL PUMP, AND PUMP HAVING A CAMSHAFT

(71) Applicant: Robert Bosch GmbH, Stuttgart (DE)

(72) Inventors: Michael Imhof, Modugno (IT); Robert Mayer, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/641,393

(22) PCT Filed: Jul. 27, 2018

(86) PCT No.: PCT/EP2018/070395
§ 371 (c)(1),
(2) Date: Feb. 24, 2020

(87) PCT Pub. No.: WO2019/038024
PCT Pub. Date: Feb. 28, 2019

(65) Prior Publication Data
US 2020/0200133 A1    Jun. 25, 2020

(30) Foreign Application Priority Data
Aug. 23, 2017 (DE) .................. 10 2017 214 728

(51) Int. Cl.
*F02M 59/10* (2006.01)
*F04B 9/04* (2006.01)
(Continued)

(52) U.S. Cl.
CPC .......... *F02M 59/102* (2013.01); *F04B 9/042* (2013.01); *B23P 2700/02* (2013.01);
(Continued)

(58) Field of Classification Search
CPC ...... F02M 59/102; F02M 59/06; F02M 59/44; F04B 1/0413; F04B 1/0538; F04B 9/042; F16H 53/025; B23P 2700/02
See application file for complete search history.

(56) References Cited

U.S. PATENT DOCUMENTS

| 2008/0121216 A1 | 5/2008 | Shafer et al. |
| 2015/0275834 A1* | 10/2015 | Crofts ............... F16J 10/04 |
| | | 92/129 |

FOREIGN PATENT DOCUMENTS

| DE | 3913104 | 6/1990 |
| DE | 102009002014 | 10/2010 |
| DE | 112012005954 | 11/2014 |

OTHER PUBLICATIONS

International Search Report for Application No. PCT/EP2018/070395 dated Sep. 24, 2018 (English Translation, 2 pages).

* cited by examiner

*Primary Examiner* — Zelalem Eshete
(74) *Attorney, Agent, or Firm* — Michael Best & Friedrich LLP

(57) ABSTRACT

A camshaft (24), in particular for a pump (10), is proposed. The camshaft (24) has at least two cams (26, 28) which are arranged next to one another in the direction of the longitudinal axis (25) of the camshaft (24) and the cam elevations of which are arranged offset with respect to one another around the longitudinal axis (25) of the camshaft (24). An intermediate region (30) is provided between two adjacent cams (26, 28), and at least one bearing region (32) is arranged next to the cams (26, 28) in the direction of the longitudinal axis (25) of the camshaft (24). The intermediate region (30) runs in axial longitudinal sections which contain the longitudinal axis (25) of the camshaft (24), at a radial spacing (r1, r2) from the longitudinal axis (25) of the (Continued)

camshaft (24), which radial spacing (r1, r2), starting from the adjacent cam (26) with the smaller cam elevation (h1) in the respective axial longitudinal section, increases towards the adjacent cam (28) with the greater cam elevation (h2) in the respective axial longitudinal section.

12 Claims, 4 Drawing Sheets

(51) Int. Cl.
  *F02M 59/06* (2006.01)
  *F02M 59/44* (2006.01)
  *F04B 1/0413* (2020.01)
  *F16H 53/02* (2006.01)

(52) U.S. Cl.
  CPC ............. *F02M 59/06* (2013.01); *F02M 59/44* (2013.01); *F04B 1/0413* (2013.01); *F16H 53/025* (2013.01)

US 10,808,665 B2

CAMSHAFT FOR A PUMP, IN PARTICULAR A HIGH PRESSURE FUEL PUMP, AND PUMP HAVING A CAMSHAFT

BACKGROUND OF THE INVENTION

The invention proceeds from a camshaft for a pump, in particular a high pressure fuel pump, of the generic type, and from a pump having a camshaft of the generic type.

Such a camshaft and such a pump in the form of a high pressure fuel pump are known from DE 10 2009 002 014 A1. This pump has two pump elements having in each case one pump piston and one camshaft by which the pump pistons are in each case driven in a reciprocating stroke movement by way of a roller tappet. The camshaft has two cams which in the direction of the longitudinal axis of said camshaft are disposed beside one another, the cam elevations of said cams being disposed so as to be mutually offset about the longitudinal axis of the camshaft. The cams can be, for example, 180° double cams, and the cam elevations of said cams can be disposed so as to be mutually offset or rotated by 90° about the longitudinal axis of the camshaft. Apart from the cams, the camshaft has at least one bearing region by way of which the camshaft is mounted so as to be rotatable about the longitudinal axis of the camshaft in a housing of the pump, for example. The spacing of the cans in the direction of the longitudinal axis of the camshaft is required in order for the two pump elements to be able to be accommodated beside one another. On account thereof, an intermediate region is present between the two cams, said intermediate region in the case of the known camshaft by external cylindrical turning being fabricated to a diameter which is approximately the size of the diameter of the bearing region. On account of the drive of the pistons, stress arises on the cams of the camshaft during the operation of the pump, said stress leading to a flexural load on the intermediate region of the camshaft. On account of the flexing of the intermediate region of the camshaft, the alignment of the cams in relation to the pump pistons is also modified in that said cams are tilted. On account thereof, high stress, for example skewing between the roller tappet and the cams, arises in the drive of the pump pistons, this leading to increased wear on the cams as well as on the roller tappet and the roller. Moreover, the at least one bearing region is also tilted on account of the flexing of the intermediate region of the camshaft, on account of which high stress, in particular one-sided stress on the edge of the bearing region of the camshaft, arises.

SUMMARY OF THE INVENTION

By contrast, the camshaft according to the invention has the advantage that the flexing of the camshaft in the intermediate region can be kept minor such that the cams and the at least one bearing region in the event of stress on the camshaft during the operation are not or only slightly tilted, and the alignment of said cams and said bearing region is largely maintained and, on account thereof, the wear on the cams as well as the roller puppets and the rollers can be kept low.

Advantageous design embodiments and refinements of the camshaft according to the invention are specified in the dependent claims. One configuration ensures that the machining of the cams is not impeded on account of the intermediate region. Another configuration enables a simple production of the intermediate region and the avoidance of increased stress as a result of a notching effect.

BRIEF DESCRIPTION OF THE DRAWINGS

Several exemplary embodiments of the invention are illustrated in the drawing and explained in more detail in the description hereunder.

DETAILED DESCRIPTION

Figure 1:
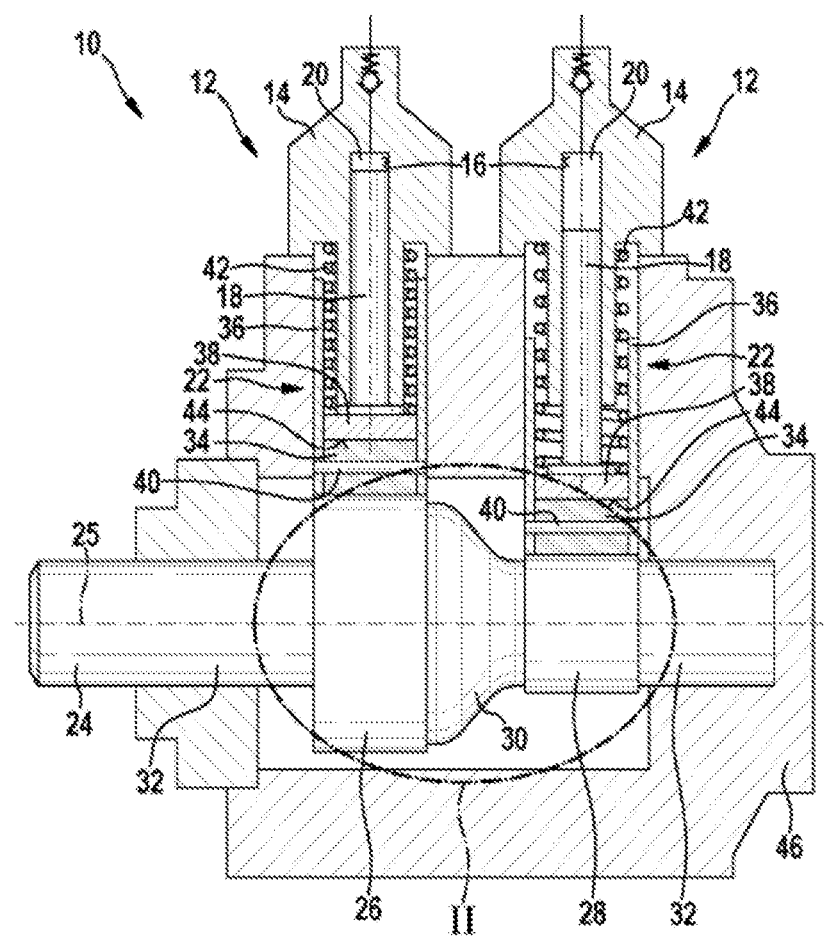
FIG. 1 in fragments shows a pump having a pump element and a camshaft in a longitudinal section.

A pump 10 which is in particular provided for the high pressure conveying of fuel in a fuel injection installation of an internal combustion engine is shown in a simplified illustration in FIGS. 1 to 6. The pump 10 has at least two pump elements 12 which have in each case one housing part 14 in which one pump piston 18 is guided so as to be movable in each case in one cylinder bore 16, said pump piston 18 delimiting a pump operating space 20 in the respective cylinder bore 16. The pump pistons 18 by way of in each case one tappet 22 and a camshaft 24 are driven in a reciprocating stroke movement in an at least almost radial direction in relation to the rotation axis 25 of the camshaft 24. The rotation axis 25 of the camshaft 24 is coaxial with the longitudinal axis of said camshaft 24. The camshaft 24 can be part of the pump 10, or alternatively it can also be provided that the pump 10 does not have a dedicated camshaft, and the camshaft 24 is part of the internal combustion engine.

The camshaft 24 for driving the pump pistons 18 has two cams 26, 28 which in the direction of the longitudinal axis 25 of said camshaft 24 are disposed beside one another and can in each case be configured as single or multiple cams, for example as 180° double cams. The cams 26, 28 are disposed so as to be mutually offset or rotated about the longitudinal axis 25 of the camshaft 24, for example so as to be offset by approximately 90° about the longitudinal axis 25. An intermediate region 30 which will be explained in more detail hereunder is present in the direction of the longitudinal axis 25 of the camshaft 24 so as to be between the two cams 26 and 28. In the direction of the longitudinal axis 25 of the camshaft 24, apart from at least one cam 26 or 28, one bearing region 32 of the camshaft 24 is in each case preferably provided beside both cams 26 and 28 on that side that faces away from the intermediate region 30.

The bearing regions 32 are in each case configured so as to be circular/cylindrical, and the camshaft 24 by way of said bearing regions 32 is mounted so as to be rotatable in respective friction bearings, for example. The tappets 22 are in each case configured as roller puppets, and one roller 34 which rolls on the cam 26 or 28, respectively, is in each case mounted so as to rotatable in said tappets 22. The tappet 22 can in each case have one tappet body 36, wherein the roller 34 in the tappet body 36 or in a roller shoe 38 disposed in the tappet body 36 is mounted in a clearance so as to be rotatable in the manner of a friction bearing by way of the external shell of said roller 34. Alternatively, the roller 34 can also be embodied so as to be hollow and mounted so as to be rotatable on a bearing pin 40 that is held in the tappet body 36. The tappet 22 and the pump piston 18 are impinged toward the cam 26 or 28, respectively, by a tappet spring 42. The tappet 22 is guided so as to be displaceable in a receptacle 44, wherein the receptacle 44 is configured in a housing part 46 of the pump 10 or in a housing part of the internal combustion engine. The housing part 14 of the two pump elements 12 can be configured so as to be integral or a separate components, and are connected to the housing part 46.

The configuration of the intermediate region 30 of the camshaft 24 will be explained in more detail hereunder. On account of the disposal of the cam elevations of the cams 26 and 28 so as to be mutually offset about the longitudinal axis 25 of the camshaft 24, said cam elevations in axial longitudinal sections that contain the longitudinal axis 25 of the camshaft 24 have dissimilar radial spacings h1 and h2 from the longitudinal axis 25. The cam 26 in an axial longitudinal section has the maximum cam elevation thereof by way of the upper dead center thereof, while the other cam 28 has the minimum cam elevation by way of the lower dead center thereof. In an axial longitudinal section that is rotated by 90° or 270° about the longitudinal axis 25, the cam 26 in this instance has the minimum cam elevation thereof by way of the lower dead center thereof, while the other cam 28 has the maximum cam elevation thereof by way of the upper dead center thereof. Dissimilar cam elevations of the two cams 26, 28 result in each axial longitudinal section as a function of the position of the respective axial longitudinal section.

The intermediate region 30 is configured such that said intermediate region 30 in axial longitudinal sections that contain the longitudinal axis 25 of the camshaft 24 runs at a radial spacing r from the longitudinal axis 25, said radial spacing r proceeding from the adjacent cam 26 having in the respective axial longitudinal section the smaller cam elevation h1 so as to increase toward the adjacent cam 28 having in the respective axial longitudinal section the larger cam elevation h2. The profile of the intermediate region 30 between the two adjacent cams 26, 28 is preferably stepless. On account thereof, the production of the intermediate region 30 is simplified, and no notching effects which can lead to increased stress result.

The intermediate regions 30 in axial longitudinal sections that contain the longitudinal axis 25 in the peripheral regions 30a of said intermediate region 30 that face the adjacent cams 26, 28 runs at a radial spacing r1 or r2, respectively, from the longitudinal axis 25 which is of equal size as or somewhat smaller than the radial spacing h1 or h2, respectively, of the cam elevation of the respective adjacent cam 26 or 28, respectively. The peripheral regions 30a of the intermediate region 30 in axial longitudinal sections that contain the longitudinal axis 25, in the radial direction in terms of the longitudinal axis 25, thus do not protrude beyond the cam elevation of the respective adjacent cam 26 or 28, respectively. It is ensured on account thereof that in the machining of the cam elevations of the cams 26, 28 by means of a tool, for example a grinding tool, there is sufficient space present for the tool to run out in the direction of the longitudinal axis 25 of the camshaft 24. The radial spacing r1 or r2, respectively, of the peripheral regions 30a of the intermediate region 30 is preferably smaller by a few millimeters than the cam elevations h1 or h2, respectively, of the adjacent cams 26 or 28, respectively. The peripheral regions 30a of the intermediate region 30 in axial longitudinal sections that contain the longitudinal axis 25 of the camshaft 24 run, for example, approximately parallel to the longitudinal axis 25. There is thus in each case one step present at the transition from the cams 26, 28 toward the peripheral regions 30a of the intermediate region 30.

Figure 2:
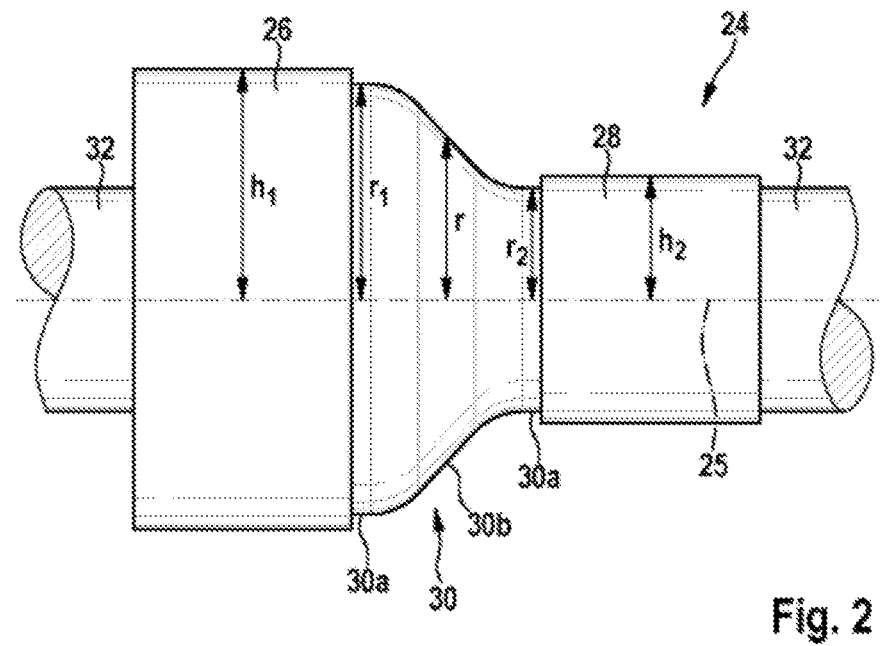
FIG. 2 shows a fragment of the camshaft in an enlarged illustration according to a first exemplary embodiment, said fragment being identified by II in FIG. 1.
Figure 3:
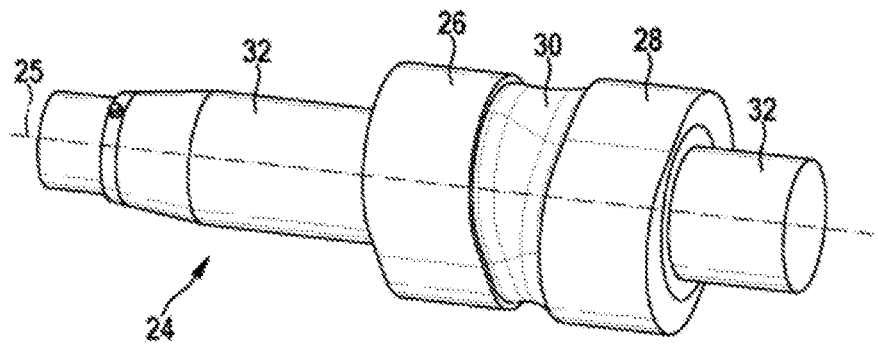
FIG. 3 shows the camshaft in a perspective illustration according to the first exemplary embodiment.

In the case of a first exemplary embodiment illustrated in FIGS. 2 and 3, the intermediate region 30 in the central region 30b thereof between the peripheral regions 30a in axial longitudinal sections that contain the longitudinal axis 25 of the camshaft 24 has a curved profile which is preferably continuous and does not have any steps and kinks. It can be seen herein in FIG. 3 how the profile of the intermediate region 30 varies across the circumference of the camshaft 24 in a manner corresponding to the profile of the cam elevations of the adjacent cams 26, 28.

Figure 4:
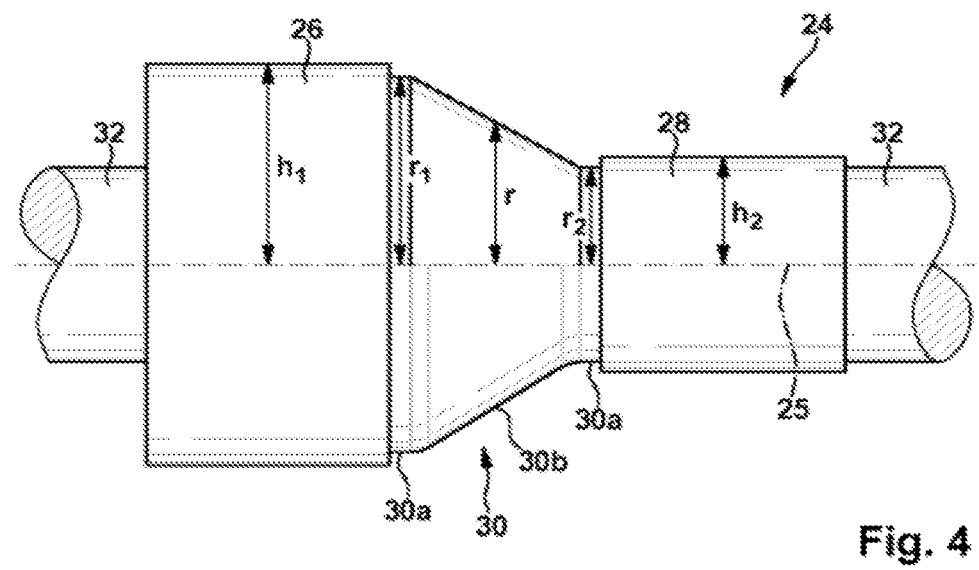
FIG. 4 shows the fragment II of the camshaft according to a second exemplary embodiment; f

In the case of a second exemplary embodiment illustrated in FIG. 4, the intermediate region 30 in the central region 30b thereof between the peripheral regions 30a in axial longitudinal sections that contain the longitudinal axis 25 of the camshaft 24 has a straight profile that is inclined in terms of the longitudinal axis 25. The transition from the central region 30b toward the peripheral regions 30a of the intermediate region 30 can be configured having a kink, as is illustrated at the top in FIG. 4, or so as to be radiused, as is illustrated at the bottom in FIG. 4.

The camshaft 24 can be produced, for example, by a forging method, wherein the contour of the intermediate region 30 can be largely generated already in the forging tool. If required, post-machining of the intermediate region 30 can take place by way of a subtractive method, for example. Alternatively, the camshaft 24 can also be produced by a casting method or a 3D printing method, in which the contour of the intermediate region 30 can be largely generated. Machining of the cams 26, 28 is not impeded on account of the configuration of the intermediate region 30 as has been explained above.

Figure 5:
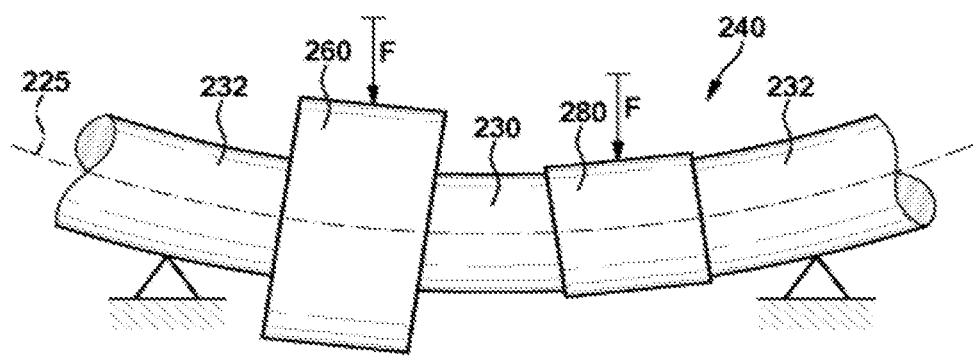
FIG. 5 shows a camshaft according to the prior art when deflecting under stress.
Figure 6:
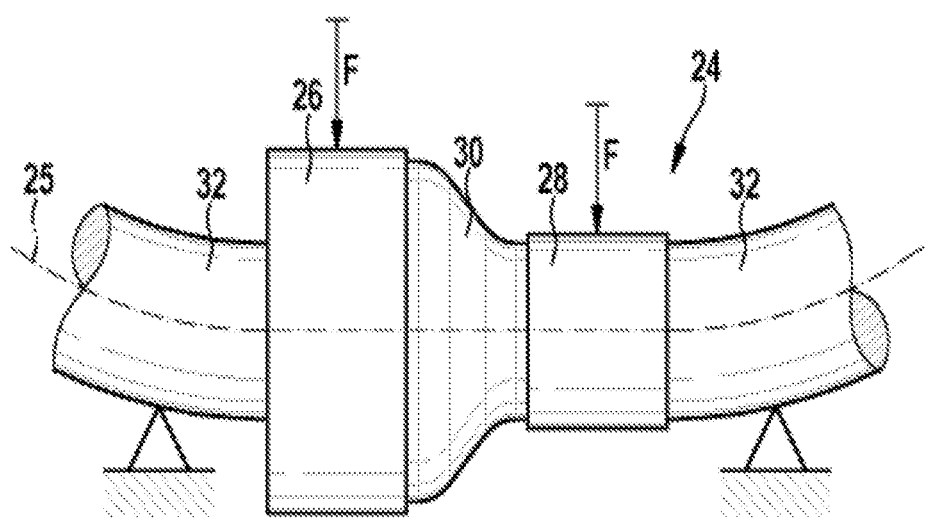
FIG. 6 shows a camshaft according to the invention when the latter deflects under stress.

The reduced deflection of the camshaft 24 according to the invention under stress in relation to a camshaft 240 according to the prior art is highlighted by means of FIGS. 5 and 6 which represent very simplified diagrams of the camshaft. A camshaft 240 according to the prior art is illustrated in FIG. 5, wherein the stress on the two cams 260 and 280 is illustrated by force arrows F, and the bearing regions 232 of the camshaft are illustrated. The deflection of the camshaft 240, in particular in the intermediate region 230 between the cams 260 and 280, can be seen from the profile of the longitudinal axis 250 of the camshaft 240. This deflection leads to tilting of the cams 260, 280, on account of which the bearing of the rollers of the roller tappets is impeded and wear is caused. In the case of the configuration according to the invention of the camshaft 24 according to FIG. 6, it can be seen from the profile of the longitudinal axis 25 that a substantially smaller deflection of the camshaft 24 is present, in particular in the intermediate region 30, such that no or only very slight tilting of the cams 26, 28 arises and the correct bearing of the rollers 34 of the tappets 22 is largely maintained and wear is thus avoided.

The invention claimed is:

1. A camshaft having at least two cams (26, 28) which in the direction of a longitudinal axis (25) of the camshaft (24) are disposed beside one another, cam elevations of said cams being mutually offset about the longitudinal axis (25) of the camshaft (24), wherein an intermediate region (30) is provided between the cams (26, 28), and the camshaft having at least one bearing region (32) which in the direction of the longitudinal axis (25) of the camshaft (24) is disposed beside the cams (26, 28), characterized in that the intermediate region (30) in axial longitudinal sections that contain the longitudinal axis (25) of the camshaft (24) runs at a radial spacing (r1, r2) from the longitudinal axis (25) of the camshaft (24), said radial spacing (r1, r2) proceeding from an adjacent one of the cams (26) having in a respective axial longitudinal section a smaller cam elevation (h1) so as to increase toward an adjacent other one of the cams (28) having in a respective axial longitudinal section a larger cam elevation (h2).

2. The camshaft as claimed in claim 1, characterized in that the intermediate region (30) in axial longitudinal sections that contain the longitudinal axis (25) of the camshaft (24) in peripheral regions (30a) of said intermediate region (30) that face the adjacent cams (26, 28) runs in each case at a radial spacing (r1, r2) from the longitudinal axis (25) of the camshaft (24) which is of equal size as or only slightly smaller than the radial spacing (h1, h2) of the cam elevation of a respective one of the adjacent cams from the longitudinal axis (25) of the camshaft (24).

3. The camshaft as claimed in claim 1, characterized in that the intermediate region (30) between the cams (26, 28) has a stepless profile.

4. The camshaft as claimed in claim 1, characterized in that the intermediate region (30) in peripheral regions (30a) thereof that face the adjacent cams (26, 28) in axial longitudinal sections that contain the longitudinal axis (25) of the camshaft (24) runs in each case at least almost parallel to the longitudinal axis (25) of the camshaft (24).

5. The camshaft as claimed in claim 1, characterized in that the intermediate region (30) in a central region (30b) that lies between peripheral regions (30a) of said intermediate region (30) that face the adjacent cams (26, 28) in axial longitudinal sections that contain the longitudinal axis (25) of the camshaft (24) has a curved profile.

6. The camshaft as claimed in claim 1, characterized in that the intermediate region (30) in a central region (30b) that lies between peripheral regions (30a) of said intermediate region (30) that face the adjacent cams (26, 28) in axial longitudinal sections that contain the longitudinal axis (25) of the camshaft (24) has a straight profile that is inclined in terms of the longitudinal axis (25) of the camshaft (24).

7. A pump having at least two pump elements (12) which have in each case one pump piston (18), and having a camshaft (24) by way of which the pump pistons (18) are at least indirectly driven in a reciprocating stroke movement, characterized in that the camshaft (24) has at least two cams (26, 28) which in the direction of a longitudinal axis (25) of the camshaft (24) are disposed beside one another, cam elevations of said cams being mutually offset about the longitudinal axis (25) of the camshaft (24), wherein an intermediate region (30) is provided between the cams (26, 28), and the camshaft has at least one bearing region (32) which in the direction of the longitudinal axis (25) of the camshaft (24) is disposed beside the cams (26, 28), and wherein the intermediate region (30) in axial longitudinal sections that contain the longitudinal axis (25) of the camshaft (24) runs at a radial spacing (r1, r2) from the longitudinal axis (25) of the camshaft (24), said radial spacing (r1, r2) proceeding from an adjacent one of the cams (26) having in a respective axial longitudinal section a smaller cam elevation (h1) so as to increase toward an adjacent other one of the cams (28) having in a respective axial longitudinal section a larger cam elevation (h2).

8. The pump as claimed in claim 7, characterized in that the intermediate region (30) in axial longitudinal sections that contain the longitudinal axis (25) of the camshaft (24) in peripheral regions (30a) of said intermediate region (30) that face the adjacent cams (26, 28) runs in each case at a radial spacing (r1, r2) from the longitudinal axis (25) of the camshaft (24) which is of equal size as or only slightly smaller than the radial spacing (h1, h2) of the cam elevation of a respective one of the adjacent cams from the longitudinal axis (25) of the camshaft (24).

9. The pump as claimed in claim 7, characterized in that the intermediate region (30) between the cams (26, 28) has a stepless profile.

10. The pump as claimed in claim 7, characterized in that the intermediate region (30) in peripheral regions (30a) thereof that face the adjacent cams (26, 28) in axial longitudinal sections that contain the longitudinal axis (25) of the camshaft (24) runs in each case at least almost parallel to the longitudinal axis (25) of the camshaft (24).

11. The pump as claimed in claim 7, characterized in that the intermediate region (30) in a central region (30b) that lies between peripheral regions (30a) of said intermediate region (30) that face the adjacent cams (26, 28) in axial longitudinal sections that contain the longitudinal axis (25) of the camshaft (24) has a curved profile.

12. The pump as claimed in claim 7, characterized in that the intermediate region (30) in a central region (30b) that lies between peripheral regions (30a) of said intermediate region (30) that face the adjacent cams (26, 28) in axial longitudinal sections that contain the longitudinal axis (25) of the camshaft (24) has a straight profile that is inclined in terms of the longitudinal axis (25) of the camshaft (24).

* * * * *